(12) United States Patent
Itou

(10) Patent No.: US 7,471,596 B2
(45) Date of Patent: Dec. 30, 2008

(54) OPTICAL DISC REPRODUCTION DEVICE AND TRACKING CONTROL METHOD APPLIED TO AN OPTICAL DISC REPRODUCTION DEVICE

(75) Inventor: Tomohiko Itou, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 629 days.

(21) Appl. No.: 11/137,420

(22) Filed: May 26, 2005

(65) Prior Publication Data

US 2005/0265146 A1 Dec. 1, 2005

(30) Foreign Application Priority Data

May 26, 2004 (JP) .............................. 2004-156702

(51) Int. Cl.
*G11B 7/00* (2006.01)

(52) U.S. Cl. ................................. 369/44.32; 369/44.34

(58) Field of Classification Search ............. 369/44.27, 369/44.28, 44.29, 44.34, 44.32, 44.25
See application file for complete search history.

(56) References Cited

U.S. PATENT DOCUMENTS

| | | | | |
|---|---|---|---|---|
| 6,999,388 B2 * | 2/2006 | Mashimo et al. | ......... | 369/44.29 |
| 7,142,488 B2 | 11/2006 | Ukawa | | |
| 2004/0105359 A1 | 6/2004 | Takagi | | |

FOREIGN PATENT DOCUMENTS

| | | | | |
|---|---|---|---|---|
| EP | 1001412 A2 * | 2/2000 | .............. | 369/44.28 |
| JP | 02-187930 A | 7/1990 | | |
| JP | 06-139583 A | 5/1994 | | |
| JP | 2000-155961 A | 6/2000 | | |
| JP | 2000-306253 | 11/2000 | | |
| JP | 2001-195750 | 7/2001 | | |
| JP | 2001-357541 A | 12/2001 | | |
| JP | 2003-151148 A | 5/2003 | | |
| JP | 2004-022077 A | 1/2004 | | |
| JP | 2004-227747 A | 8/2004 | | |

OTHER PUBLICATIONS

Japanese Office Action dated Nov. 20, 2007 with English Translation (Six (6) pages).

* cited by examiner

*Primary Examiner*—Nabil Z Hindi
(74) *Attorney, Agent, or Firm*—Crowell & Moring LLP

(57) ABSTRACT

For automatic adjustment of tracking balance, a microprocessor controls a servo control unit to adjust a tracking balance signal value for the optical disc reproduction to be a mid-value between a tracking balance signal value (hereafter referred to as first tracking balance signal value) to make a tracking error balance value 0% and a tracking balance signal value (hereafter referred to as second tracking balance signal value) to minimize jitter when the first tracking balance signal value is different from the second tracking balance signal value. This makes it possible to perform balanced tracking control with a good balance between tracking performance and jitter performance.

8 Claims, 4 Drawing Sheets

OPTICAL DISC REPRODUCTION DEVICE AND TRACKING CONTROL METHOD APPLIED TO AN OPTICAL DISC REPRODUCTION DEVICE

BACKGROUND OF THE INVENTION

1. Field of the Invention

The present invention relates to an optical disc reproduction device using an optical disc such as CD (Compact Disc) or DVD (Digital Versatile Disc), and a tracking control method applied to the optical disc reproduction device.

2. Description of the Related Art

A conventional optical disc reproduction device for reproducing information, such as images, sounds and characters, recorded on an optical disc such as CD (Compact Disc), LD (Laser Disc), DVD (Digital Versatile Disc), DVD-ROM (DVD-Read Only Memory) or MD (Mini Disc) is configured such that laser light is irradiated onto a disc surface of the optical disc, and a photodetector in an optical pickup converts the light reflected from the disc surface into electric signals. Based on the electric signals, the optical disc reproduction device reads the information recorded on the optical disc, and corrects focus deviations of the light irradiated onto the disc surface. For example, a photodetector, which is used for a focusing servo mechanism based on the astigmatism method and which has a light receiving portion divided into four regions, outputs four detection signals corresponding to the respective light receiving regions. Based on the detection signals, the optical disc reproduction device generates various signals such as RF (Radio Frequency) signals, focus error signals and tracking error signals.

Meanwhile, an optical disc reproduction device is designed to suppress, as much as possible, jitters such as: jitter due to tilt of e.g. a disc tray; jitter influenced by warpage of an optical disc; jitter due to waveform interference caused by light diffraction when reading an optical disc, and/or due to aberrations of a reproduction optical system, and/or due to influence of noises, and/or due to lowered level of detected signals; and jitter of an electric circuit system.

A conventional optical disc reproduction device automatically performs focus adjustment and tracking adjustment when it starts reading an optical disc. For the focus adjustment, the optical disc reproduction device performs adjustment such that a light beam or laser light from an optical pickup is focused on a recording surface of the optical disc at an optimum point for jitter where an RF signal becomes maximum. For the tracking adjustment, the optical disc reproduction device performs adjustment such that the laser light accurately traces a track on the recording surface of the optical disc.

For tracking control, the conventional optical disc reproduction device adjusts a tracking balance signal value (hereafter often referred to simply as "TBAL signal value") such that a tracking error balance value (hereafter often referred to simply as "TE Balance value") becomes 0% (zero percent), unconditionally assuming that a TBAL signal value to make the TE balance value 0% coincides with a TBAL signal value to minimize the jitter. However, this assumption may not always be correct e.g. as shown in FIG. 4. FIG. 4 is a graph showing an example of TBAL-Jitter characteristics of a DVD-R (DVD-Rewritable) where the left vertical axis represents jitter value and the right vertical axis represents TE Balance value, while the horizontal axis represents TBAL signal value, for explaining a tracking control problem in the conventional optical disc reproduction device. In FIG. 4, curves A and B show jitter at an inner circumference (inner jitter) and jitter at an outer circumference (outer jitter) of the disc, respectively, while broken-line C and line D show TE Balance value and approximated line of the TE Balance value (TE Balance line). As indicated in FIG. 4, the jitter may not always be minimum at the TE Balance value of 0%, e.g. due to warpage or flaws of the optical disc. Accordingly, the conventional optical disc reproduction device has a problem that it cannot perform balanced tracking control with a good balance between tracking performance and jitter performance.

SUMMARY OF THE INVENTION

An object of the present invention is to provide an optical disc reproduction device that can perform balanced tracking control with a good balance between tracking performance and jitter performance, and to provide a tracking control method applied to the optical disc reproduction device.

According to a first aspect of the present invention, we provide an optical disc reproduction device comprising: (a) an optical pickup including: a semiconductor laser for irradiating laser light onto an optical disc; an objective lens for condensing, onto a disc surface of the optical disc, the laser light irradiated from the semiconductor laser onto the optical disc; and a photodetector having a light receiving portion, divided into a plurality of regions, for detecting light reflected from the disc surface in which the reflected light is reflected light of the laser light irradiated onto the disc surface of the optical disc via the objective lens; (b) an RF signal amplifier means for amplifying RF signals which are output from the photodetector, and which correspond to information recorded on the optical disc; (c) a signal processing means including: a tracking signal processing means for generating a tracking error signal that corresponds to an amount of focus deviation of the irradiation light from a track on the disc surface of the optical disc, in which the irradiation light is the laser light irradiated onto the disc surface via the objective lens; a jitter signal processing means for measuring jitter level of the RF signal output from the RF signal amplifier means, and for generating a tracking signal for jitter control; a focus signal processing means for generating a focus error signal that corresponds to an amount of the focus deviation of the irradiation light from the disc surface, in which the irradiation light is the light irradiated onto the disc surface via the objective lens; and an RF signal processing means for processing the RF signal output from the RF signal amplifier means; (d) a servo control means for adjusting the laser light to be on the track and also adjusting the position of the objective lens according to the tracking error signal, the tracking signal for jitter control and the focus error signal that are output from the signal processing means so as to adjust the focus position of the laser light irradiated from the semiconductor laser; (e) a decoder for decoding, based on the RF signal output from the signal processing means, information including video and/or audio recorded on the optical disc; and (f) a microprocessor for controlling the optical pickup, the RF signal amplifier means, the signal processing means, the servo control means and the decoder.

For automatic adjustment of tracking balance, the microprocessor controls the servo control means to adjust a tracking balance signal value for the optical disc reproduction to be a value between a tracking balance signal value (hereafter referred to as first tracking balance signal value) to make a tracking error balance value 0% and a tracking balance signal value (hereafter referred to as second tracking balance signal value) to minimize jitter when the first tracking balance signal value is different from the second tracking balance signal value.

According to the first aspect of the present invention, the optical disc reproduction device can perform balanced tracking control with a good balance between tracking performance and jitter performance. This is in contrast to the conventional optical disc reproduction device which unconditionally uses a tracking balance signal value to make a tracking error balance value 0% as a tracking balance signal value for the optical disc reproduction, wherein the conventional tracking control can be said as tracking control which considers only tracking performance.

Preferably, for automatic adjustment of the tracking balance, the microprocessor controls the servo control means to adjust the tracking balance signal value for the optical disc reproduction to be a mid-value between the first tracking balance signal value and the second tracking balance signal value when the first tracking balance signal value is different from the second tracking balance signal value.

Further preferably, the photodetector comprises a photodiode having the light receiving portion divided into six regions.

According to a second aspect of the present invention, we provide a tracking control method applied to an optical disc reproduction device, the method comprising the steps of: detecting a tracking balance signal value (hereafter referred to as first tracking balance signal value) to make a tracking error balance value 0%; detecting a tracking balance signal value (hereafter referred to as second tracking balance signal value) to minimize jitter; determining whether or not the first tracking balance signal value is equal to the second tracking balance signal value; and controlling tracking servo to adjust a tracking balance signal value for the optical disc reproduction to be a value between the first tracking balance signal value and the second tracking balance signal value when the first tracking balance signal value is different from the second tracking balance signal value.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

The best mode and preferred embodiments of the present invention will be described hereinafter with reference to the annexed drawings.

Figure 1:
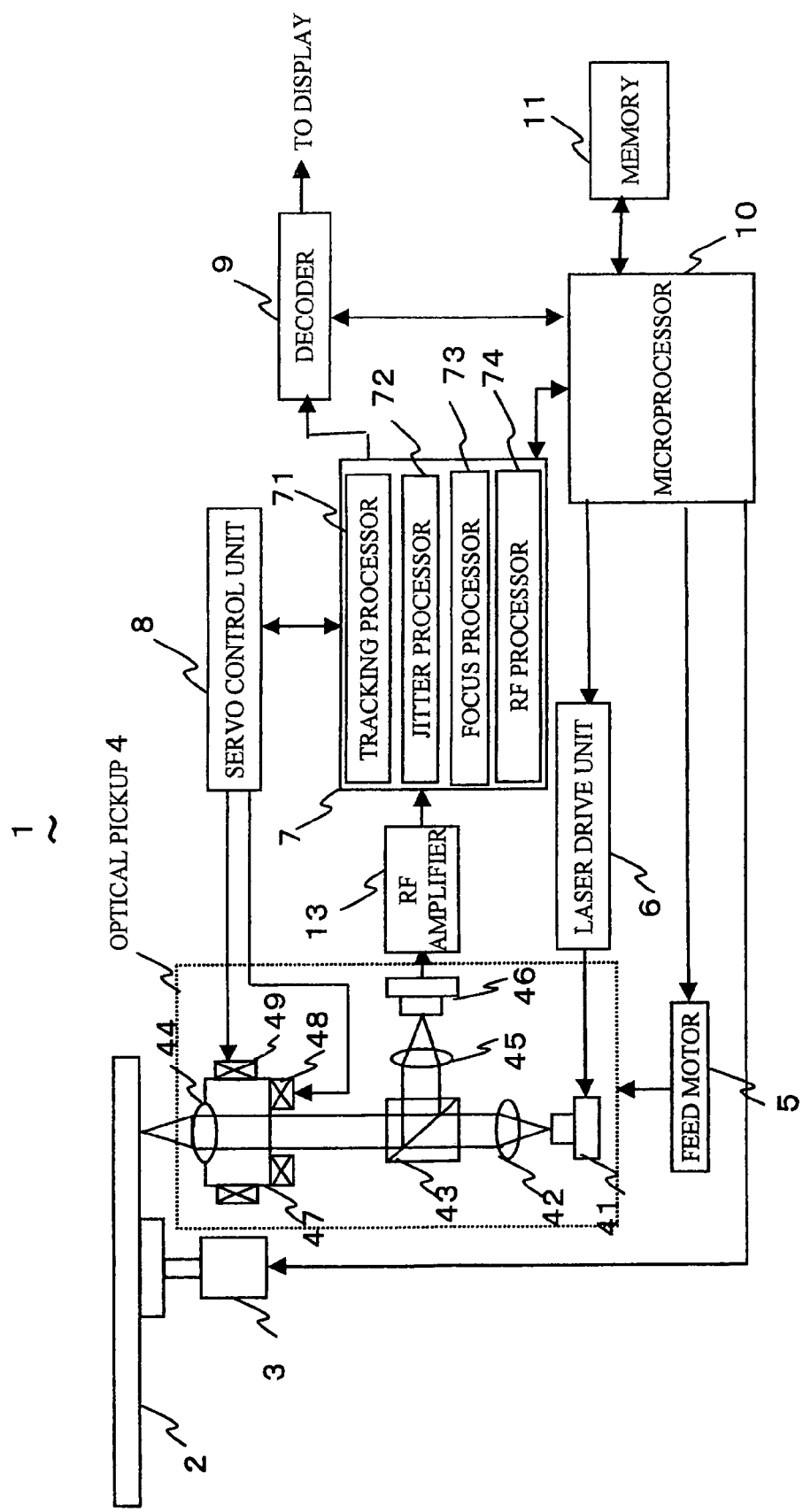
FIG. 1 is a schematic block diagram of an optical disc reproduction device according to an embodiment of the present invention.

FIG. 1 shows a block diagram of an optical disc reproduction device 1 according to an embodiment of the present invention. The optical disc reproduction device 1 is a device to read and reproduce compressed data, such as video and audio, recorded on an optical disc 2, and is a system to generate tracking error signals using a one-beam tracking method based on a phase difference method, and to generate focus error signals using an astigmatism method. According to the present embodiment, the optical disc reproduction device 1 is primarily assumed as a DVD player or a DVD recorder.

The optical disc reproduction device 1 comprises: a spindle motor 3 for rotating the optical disc 2 mounted in a tray; an optical pickup 4 for outputting, in an RF (Radio Frequency) signal form, information recorded on the optical disc 2, the optical pickup 4 including a semiconductor laser 41 and a photodetector 46; a feed motor 5 for feeding the optical pickup 4 in a radial direction of the optical disc 2; a laser drive unit 6 for controlling the semiconductor laser 41 of the optical pickup 4; an RF amplifier circuit (RF amplifier) 13 (claimed RF signal amplifier means) for amplifying RF signals, which correspond to the information recorded on the optical disc 2, and which are output from and converted into electric signals by the photodetector 46 of the optical pickup 4; and a signal processing unit 7 (claimed signal processing means) for generating various signals based on signals output from a light receiving portion of the photodetector 46.

The optical pickup 4 includes the semiconductor laser 41, a collimator lens 42, a beam splitter 43, an objective lens 44, a condenser lens 45, the photodetector 46, and so on. The semiconductor laser 41 irradiates laser light onto the optical disc 2. The photodetector 46 comprises a photodiode having a light receiving portion divided into a plurality of regions, preferably six regions, and detects and converts light reflected from a disc surface of the optical disc 2 into electric signals, in which the reflected light is reflected light of the laser light or light beam irradiated onto the disc surface of the optical disc 2.

The optical disc reproduction device 1 further comprises a microprocessor 10 for controlling the entirety thereof. The light emission of the semiconductor laser 41 is controlled by the laser drive unit 6 according to output signals of the microprocessor. 10. The laser light output from the semiconductor laser 41 is condensed onto the optical disc 2 by and via the objective lens 44 as well as the collimator lens 42 and the beam splitter 43. The light reflected from the optical disc 2 enters the beam splitter 43 via the objective lens 44, and is deflected by the beam splitter 43 by an angle of 90 degrees, and is farther condensed onto the photodetector 46 by the condenser lens 45.

The objective lens 44 is held by a lens holder 47. Provided in the vicinity of the lens holder 47 are: a focusing coil 48 for moving the lens holder 47 in the optical axis direction of the objective lens 44 by magnetic action; and a tracking coil 49 for moving the lens holder 47 in the radial direction of the optical disc 2 by magnetic action. A servo control unit 8 (claimed servo control means) (described later also) controls each of these coils 48 and 49 for finely adjusting the position of the lens holder 47 and the position of the objective lens 44 held on the lens holder 47, thereby controlling tracking servo.

The signal processing unit 7 includes, at least, a tracking signal processing unit (tracking processor) 71 (claimed tracking signal processing means), a jitter signal processing unit (jitter processor) 72 (claimed jitter signal processing means), a focus signal processing unit (focus processor) 73 (claimed focus signal processing means), and an RF signal processing unit (RF processor) 74 (claimed RF signal processing means).

Based on a detected signal output from the photodetector 46 and amplified by the RF amplifier circuit 13, the tracking signal processing unit 71 generates a tracking error signal that corresponds to an amount of focus deviation or defocus of the irradiation light from a track on the disc surface of the optical disc 2, in which the irradiation light is the light irradiated onto the disc surface via the objective lens 44. The jitter signal processing unit 72 measures the jitter level, and generates a jitter control signal, more specifically a tracking signal for jitter control. The focus signal processing unit 73 generates a focus error signal that corresponds to an amount of focus deviation or defocus of the irradiation light from the disc surface of the optical disc 2, in which the irradiation light is the light irradiated onto the disc surface via the objective lens 44. The RF signal processing unit 74 performs RF signal processing for demodulating an RF signal from the RF amplifier circuit 13 into a baseband signal.

The servo control unit 8 adjusts the position of the objective lens 44 according to the tracking error signal, the jitter control signal and the focus error signal that are output from the signal processing unit 7 so as to adjust the focus position of the laser light irradiated from the semiconductor laser 41, thereby forming a tracking servo system. The optical disc reproduction device 1 further comprises a decoder 9 for decoding or reproducing, based on the RF signal, information including video and/or audio. The optical disc reproduction device 1 still further comprises a memory 11 storing information necessary for the control by the microprocessor 10. The microprocessor 10 controls the spindle motor 3, the feed motor 5, the laser drive unit 6, the signal processing unit 7, the servo control unit 8, the decoder 9, the memory 11 and so on so as to control the entire optical disc reproduction device 1.

Figure 2:
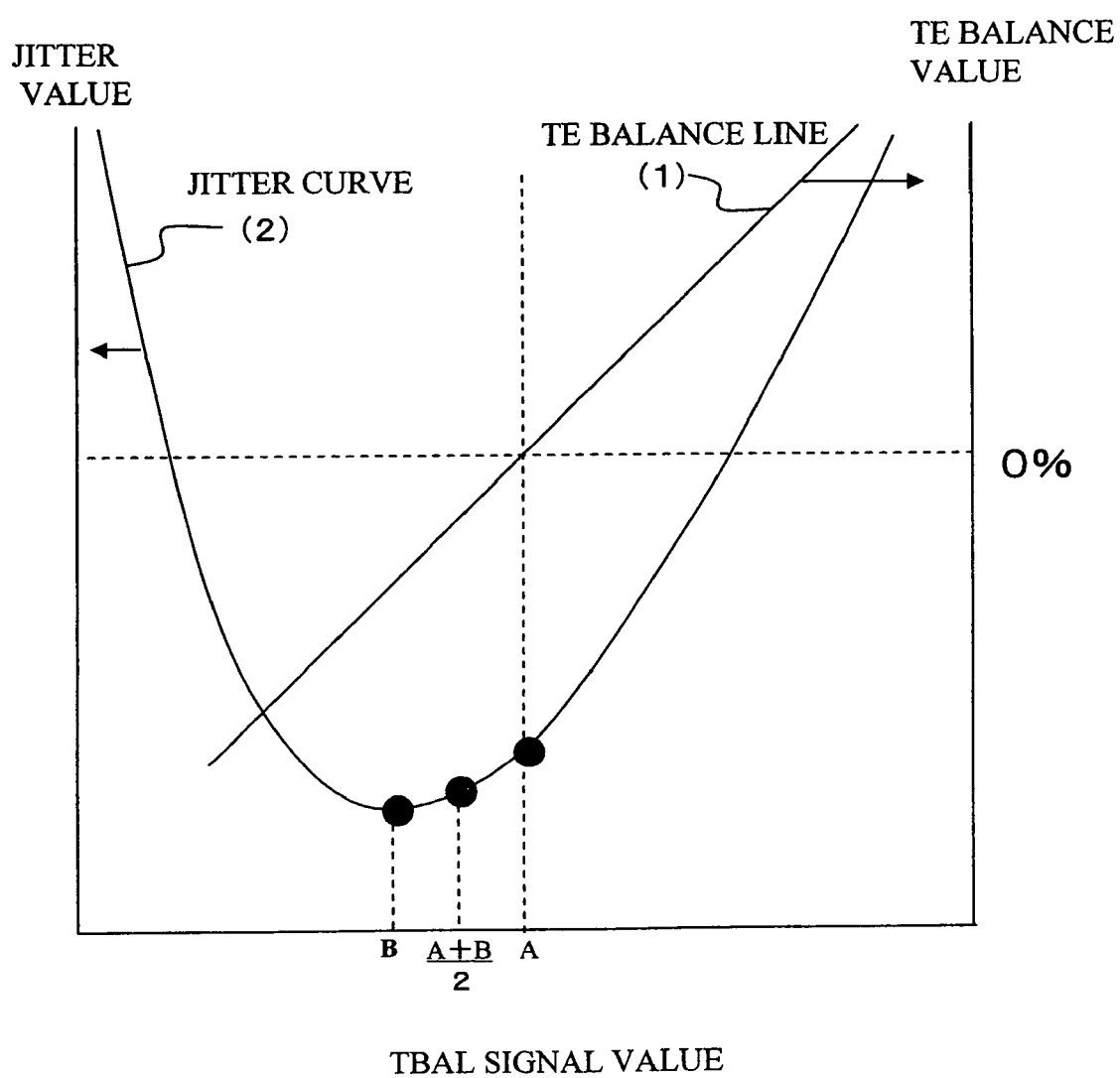
FIG. 2 is a graph for explaining a tracking control method for the optical disc reproduction device.

Hereinafter, referring to FIG. 2 which is a graph showing relative relation between tracking error balance (hereafter referred to simply as TE Balance) characteristics and jitter characteristics, the concept of tracking control or tracking control method will be described. In FIG. 2, the left vertical axis represents jitter value, and the right vertical axis represents TE Balance value, while the horizontal axis represents tracking balance signal value (hereafter referred to simply as "TBAL signal value") which is tracking control signal. In FIG. 2, line (1) is a TE Balance line, and curve (2) is a jitter curve.

In FIG. 2, TBAL signal value A (claimed first tracking balance signal value) is a TBAL signal value at the TE Balance value of 0%, while TBAL signal value B (claimed second tracking balance signal value) is a TBAL signal value when the jitter value is minimum. Primarily, the TBAL signal value A should coincide with the TBAL signal value B. However, e.g. due to warpage or flaws of the optical disc 2, the TBAL signal value A actually may not always coincide with the TBAL signal value B. In such case, for automatic adjustment of the tracking balance, the optical disc reproduction device 1 adjusts, more specifically the microprocessor 10 controls the servo control unit 8 to adjust, the TBAL signal value to be a value between, more preferably a mid-value between, the TBAL signal value A and the TBAL signal value B as shown by (A+B)/2 on the horizontal axis of FIG. 2 so as to perform balanced adjustment between the TE Balance characteristics and the jitter characteristics.

Figure 3:
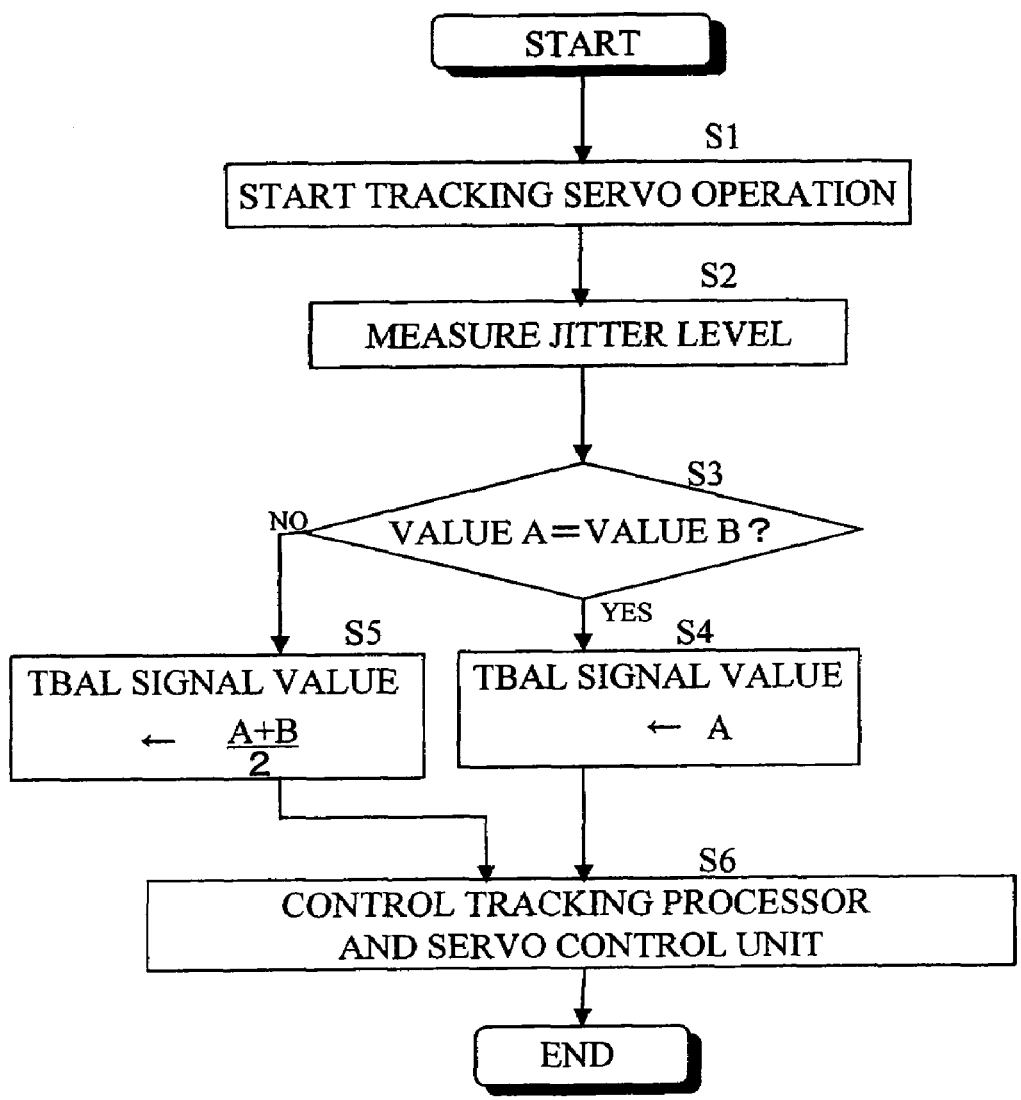
FIG. 3 is a flow chart of a tracking control process for the optical disc reproduction device.
Figure 4:
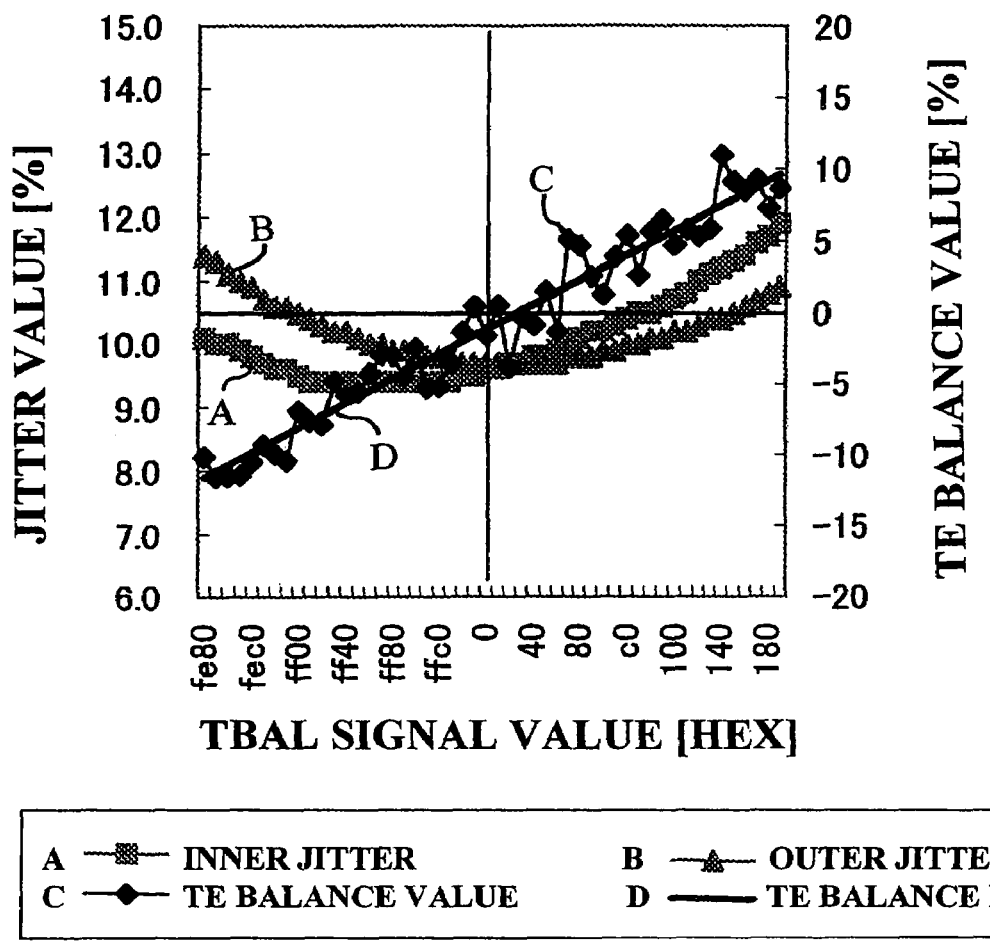
FIG. 4 is a graph for explaining a tracking control problem in a conventional optical disc reproduction device.

Referring again to FIG. 1, and additionally to FIG. 3 which shows a flow chart of a tracking control process for the optical disc reproduction device 1, the following describes details of the tracking control process or method. When the microprocessor 1 commands the servo control unit 8 to start tracking servo operation with the tracking servo system being in an open loop state, the servo control unit 8 starts the tracking servo operation by varying the distance between the objective lens 44 and the track on the disc surface of the optical disc 2 (S1). When the microprocessor 10 detects the start of the tracking servo operation by the servo control unit 8, the microprocessor 10 sends, to the signal processing unit 7, a detected RF signal output from each light receiving region of the light receiving portion of the photodetector 46 (not shown).

The tracking signal processing unit 71 of the signal processing unit 7 measures a TE Balance value, and controls the servo control unit 8 so as to detect TBAL signal value A to make the value of the TE Balance value 0%, and further holds the then TBAL signal value A. The microprocessor 10 stores the then TBAL signal value A in the memory 11. On the other hand, under command of the microprocessor 10, the jitter signal processing unit 72 of the signal processing unit 7 measures jitter level (S2), and detects TBAL signal value B to minimize the jitter level. The microprocessor 10 stores the then TBAL signal value B in the memory 11.

The microprocessor 10 compares the stored TBAL signal value A and TBAL signal value B (S3), namely determines whether or not the TBAL signal value A is equal to the TBAL signal value B, and sets A (S4) as the TBAL signal value if A=B (YES in S3), and further sets (A+B)/2 (S5) as the TBAL signal value if A is different from B (NO in S3). The microprocessor 10 controls the tracking signal processing unit 71 and the servo control unit 8 on the basis of these TBAL signal values (S6).

In other words, according to the optical disc reproduction device 1 described above, when the microprocessor 10 starts reading the optical disc 2, the microprocessor 10 generates a value between, more preferably a mid-value between, two TBAL signal values, one of which is a TBAL signal value to make 0% the TE Balance value from the tracking signal processing unit 71, and the other of which is a TBAL signal value to minimize the jitter from the jitter signal processing unit 72. Using this value between or this mid-value of these TBAL signal values as a tracking balance signal value for the optical disc reproduction, the microprocessor 10 controls the tracking signal processing unit 71 so as to control the servo control unit 8. Putting it in another way, the microprocessor 10 controls the servo control unit 8 so that the TBAL signal value, when reproducing data recorded on the optical disc 2, coincides with the mid-value between the TBAL value A and the TBAL value B. This makes it possible to adjust the tracking balance to be optimum.

Thus, the optical disc reproduction device 1 and the tracking control method therefor according to the present embodiment can perform balanced tracking control with a good balance between tracking performance and jitter performance. This is in contrast to the conventional optical disc reproduction device which unconditionally uses a tracking balance signal value to make a tracking error balance value 0% as a tracking balance signal value for the optical disc reproduction, wherein the conventional tracking control can be said as tracking control which considers only tracking performance. Thereby, in the optical disc reproduction device 1, the decoder 9 can accurately decode or reproduce information, such as video and audio, based on the RF signal output from the RF signal processing unit 74 of the signal processing unit 7.

It is to be noted that the present invention is not limited to the above embodiment; and various modifications are possible. For example, the optical disc reproduction device is not limited to a DVD player or a DVD recorder, but can be an optical disc player or recorder other than DVD. Further, the TBAL signal value to be used for the tracking control in reproduction of data recorded on an optical disc is not necessarily the mid-value between the TBAL signal value A, which makes the TE Balance value 0%, and the TBAL signal value B, which minimizes jitter, but can be a value between the TBAL signal value A and the TBAL signal value B.

This application is based on Japanese patent application 2004-156702 filed May 26, 2004, the contents of which are hereby incorporated by reference.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc reproduction device comprising:
   an optical pickup including: a semiconductor laser for irradiating laser light onto an optical disc; an objective lens for condensing, onto a disc surface of the optical disc, the laser light irradiated from the semiconductor laser onto the optical disc; and a photodetector having a light receiving portion, divided into a plurality of regions, for detecting light reflected from the disc surface in which the reflected light is reflected light of the laser light irradiated onto the disc surface of the optical disc via the objective lens;
   an RF signal amplifier means for amplifying RF signals which are output from the photodetector, and which correspond to information recorded on the optical disc;
   a signal processing means including: a tracking signal processing means for generating a tracking error signal that corresponds to an amount of focus deviation of the irradiation light from a track on the disc surface of the optical disc, in which the irradiation light is the laser light irradiated onto the disc surface via the objective lens; a jitter signal processing means for measuring jitter level of the RF signal output from the RF signal amplifier means, and for generating a tracking signal for jitter control; a focus signal processing means for generating a focus error signal that corresponds to an amount of the focus deviation of the irradiation light from the disc surface, in which the irradiation light is the light irradiated onto the disc surface via the objective lens; and an RF signal processing means for processing the RF signal output from the RF signal amplifier means;
   a servo control means for adjusting the laser light to be on the track and also adjusting the position of the objective lens according to the tracking error signal, the tracking signal for jitter control and the focus error signal that are output from the signal processing means so as to adjust the focus position of the laser light irradiated from the semiconductor laser;
   a decoder for decoding, based on the RF signal output from the signal processing means, information including video and/or audio recorded on the optical disc; and
   a microprocessor for controlling the optical pickup, the RF signal amplifier means, the signal processing means, the servo control means and the decoder,
   wherein for automatic adjustment of tracking balance, the microprocessor controls the servo control means to adjust a tracking balance signal value for the optical disc reproduction to be a value between a tracking balance signal value to make a tracking error balance value 0% (hereafter referred to as first tracking balance signal value) and a tracking balance signal value to minimize jitter (hereafter referred to as second tracking balance signal value) when the first tracking balance signal value is different from the second tracking balance signal value.

2. The optical disc reproduction device according to claim 1, wherein for automatic adjustment of the tracking balance, the microprocessor controls the servo control means to adjust the tracking balance signal value for the optical disc reproduction to be a mid-value between the first tracking balance signal value and the second tracking balance signal value when the first tracking balance signal value is different from the second tracking balance signal value.

3. The optical disc reproduction device according to claim 2, wherein the photodetector comprises a photodiode having the light receiving portion divided into six regions.

4. The optical disc reproduction device according to claim 1, wherein the photodetector comprises a photodiode having the light receiving portion divided into six regions.

5. A tracking control method applied to an optical disc reproduction device, the method comprising the steps of:
   detecting a tracking balance signal value (hereafter referred to as first tracking balance signal value) to make a tracking error balance value 0%;
   detecting a tracking balance signal value (hereafter referred to as second tracking balance signal value) to minimize jitter;
   determining whether or not the first tracking balance signal value is equal to the second tracking balance signal value; and
   controlling tracking servo to adjust a tracking balance signal value for the optical disc reproduction to be a value between the first tracking balance signal value and the second tracking balance signal value when the first tracking balance signal value is different from the second tracking balance signal value.

6. The tracking control method according to claim 5, wherein the step of controlling tracking servo adjusts the tracking balance signal value for the optical disc reproduction to be a mid-value between the first tracking balance signal and the second tracking balance signal value when the first tracking balance signal value is different from the second tracking balance signal value.

7. The tracking control method according to claim 6, wherein the optical disc reproduction device comprises an optical pickup comprising a photodetector which comprises a photodiode having a light receiving portion divided into six regions.

8. The tracking control method according to claim 5, wherein the optical disc reproduction device comprises an optical pickup comprising a photodetector which comprises a photodiode having a light receiving portion divided into six regions.

* * * * *